United States Patent
Malkes et al.

(10) Patent No.: US 10,395,522 B2
(45) Date of Patent: Aug. 27, 2019

(54) ADAPTIVE TRAFFIC OPTIMIZATION USING UNMANNED AERIAL VEHICLES

(71) Applicant: Cubic Corporation, San Diego, CA (US)

(72) Inventors: William A. Malkes, Knoxville, TN (US); William S. Overstreet, Knoxville, TN (US); Jeffery R. Price, Knoxville, TN (US); Michael J. Tourville, Lenoir City, TN (US)

(*) Notice: Subject to any disclaimer, the term of this patent is extended or adjusted under 35 U.S.C. 154(b) by 0 days.

(21) Appl. No.: 16/059,886

(22) Filed: Aug. 9, 2018

(65) Prior Publication Data
US 2019/0051163 A1    Feb. 14, 2019

Related U.S. Application Data

(60) Provisional application No. 62/545,257, filed on Aug. 14, 2017.

(51) Int. Cl.
*G08G 1/01* (2006.01)
*B64C 39/02* (2006.01)
(Continued)

(52) U.S. Cl.
CPC ......... *G08G 1/0145* (2013.01); *B64C 39/024* (2013.01); *G06K 9/0063* (2013.01); *G08G 1/012* (2013.01); *G08G 1/0116* (2013.01); *G08G 1/0129* (2013.01); *G08G 1/0133* (2013.01); *G08G 1/04* (2013.01); *G08G 1/08* (2013.01); *G08G 5/006* (2013.01); *G08G 5/0013* (2013.01);
(Continued)

(58) Field of Classification Search
CPC ...... G08G 1/0145; G08G 1/07; G08G 5/0069; G08G 5/0078
USPC .......................... 340/933, 934, 937, 916, 917
See application file for complete search history.

(56) References Cited

U.S. PATENT DOCUMENTS 4,833,469 A    5/1989  David
5,111,401 A    5/1992  Everette et al.
(Continued)

FOREIGN PATENT DOCUMENTS

| CN | 100533151 | 8/2009 |
|---|---|---|
| CN | 101799987 | 8/2010 |
| CN | 101944295 | 1/2011 |
| EP | 0 464 821 | 1/1992 |
| KR | 2013-0067847 | 6/2013 |

OTHER PUBLICATIONS

U.S. Appl. No. 16/030,396 Office Action dated Nov. 20, 2018.
(Continued)

*Primary Examiner* — Toan N Pham
(74) *Attorney, Agent, or Firm* — Kilpatrick Townsend & Stockton, LLP

(57) ABSTRACT

Systems and methods of adaptive traffic control based on detected anomalies in traffic conditions and utilizing unmanned aerial vehicles (UAVs) to determine root causes thereof are disclosed. One aspect of the present disclosure is a method including receiving traffic data at an intersection; determining statistics associated with traffic at the intersection based on the traffic data; detecting an anomaly in the traffic based on the statistics; utilizing an unmanned aerial vehicle (UAV) to determine a root cause of the anomaly; and communicating an anomaly rule based on the root cause to a light controller to control traffic at the intersection.

20 Claims, 12 Drawing Sheets

(51) Int. Cl.
*G08G 1/08* (2006.01)
*G06K 9/00* (2006.01)
*G08G 1/04* (2006.01)
*G08G 5/00* (2006.01)

(52) U.S. Cl.
CPC ......... *G08G 5/0026* (2013.01); *G08G 5/0069* (2013.01); *G08G 5/0078* (2013.01); *B64C 2201/127* (2013.01)

(56) References Cited

U.S. PATENT DOCUMENTS

| | | |
|---|---|---|
| 5,208,584 A | 5/1993 | Kaye et al. |
| 5,406,490 A | 4/1995 | Braegas |
| 5,444,442 A | 8/1995 | Sadakata et al. |
| 6,064,139 A | 5/2000 | Ozawa et al. |
| 6,075,874 A | 6/2000 | Higashikubo et al. |
| 6,317,058 B1 | 11/2001 | Lemelson et al. |
| 6,366,219 B1 | 4/2002 | Hoummady |
| 6,405,132 B1 | 6/2002 | Breed et al. |
| 6,505,046 B1 | 1/2003 | Baker |
| 6,526,352 B1 | 2/2003 | Breed et al. |
| 6,720,920 B2 | 4/2004 | Breed et al. |
| 6,741,926 B1 | 5/2004 | Zhao et al. |
| 6,751,552 B1 | 6/2004 | Minelli |
| 6,768,944 B2 | 7/2004 | Breed et al. |
| 6,862,524 B1 | 3/2005 | Nagda et al. |
| 6,937,161 B2 | 8/2005 | Nishimura |
| 7,110,880 B2 | 9/2006 | Breed et al. |
| 7,610,146 B2 | 10/2009 | Breed |
| 7,630,806 B2 | 12/2009 | Breed |
| 7,698,055 B2 | 4/2010 | Horvitz et al. |
| 7,698,062 B1 | 4/2010 | McMullen et al. |
| 7,821,421 B2 | 10/2010 | Tamir et al. |
| 7,835,859 B2 | 11/2010 | Bill |
| 7,899,611 B2 | 3/2011 | Downs et al. |
| 7,979,172 B2 | 7/2011 | Breed |
| 8,050,863 B2 | 11/2011 | Trepagnier et al. |
| 8,135,505 B2 | 3/2012 | Vengroff et al. |
| 8,144,947 B2 | 3/2012 | Kletter |
| 8,212,688 B2 | 7/2012 | Morioka et al. |
| 8,255,144 B2 | 8/2012 | Breed et al. |
| 8,373,582 B2 | 2/2013 | Hoffberg |
| 8,566,029 B1 | 10/2013 | Lopatenko et al. |
| 8,589,069 B1 | 11/2013 | Lehman |
| 8,682,812 B1 | 3/2014 | Ran |
| 8,706,394 B2 | 4/2014 | Trepagnier et al. |
| 8,825,350 B1 | 9/2014 | Robinson |
| 8,903,128 B2 | 12/2014 | Shet et al. |
| 9,043,143 B2 | 5/2015 | Han |
| 9,387,928 B1 | 7/2016 | Gentry et al. |
| 9,965,951 B1 | 5/2018 | Gallagher et al. |
| 2004/0155811 A1 | 8/2004 | Albero et al. |
| 2005/0187708 A1 | 8/2005 | Joe et al. |
| 2007/0162372 A1 | 7/2007 | Anas |
| 2007/0208494 A1 | 9/2007 | Chapman et al. |
| 2007/0273552 A1 | 11/2007 | Tischer |
| 2008/0094250 A1 | 4/2008 | Myr |
| 2008/0195257 A1 | 8/2008 | Rauch |
| 2009/0048750 A1 | 2/2009 | Breed |
| 2009/0051568 A1 | 2/2009 | Corry et al. |
| 2011/0037618 A1 | 2/2011 | Ginsberg et al. |
| 2011/0205086 A1 | 8/2011 | Lamprecht et al. |
| 2012/0038490 A1 | 2/2012 | Verfuerth |
| 2012/0112928 A1 | 5/2012 | Nishimura et al. |
| 2013/0287261 A1* | 10/2013 | Lee ............... G08G 1/0145 382/104 |
| 2014/0136414 A1 | 5/2014 | Abhyanker |
| 2014/0277986 A1 | 9/2014 | Mahler et al. |
| 2017/0169309 A1 | 6/2017 | Reddy et al. |
| 2018/0026718 A1* | 1/2018 | Leiba ............ H04B 10/1129 370/310 |
| 2018/0061235 A1* | 3/2018 | Goldberg ........... B64C 39/024 |
| 2018/0075739 A1 | 3/2018 | Ginsberg et al. |
| 2018/0075759 A1* | 3/2018 | Kim .................. G08G 5/0069 |
| 2019/0049264 A1 | 2/2019 | Malkes |
| 2019/0050647 A1 | 2/2019 | Malkes |
| 2019/0051152 A1 | 2/2019 | Malkes |
| 2019/0051160 A1 | 2/2019 | Malkes |
| 2019/0051161 A1 | 2/2019 | Malkes |
| 2019/0051162 A1 | 2/2019 | Malkes |
| 2019/0051164 A1 | 2/2019 | Malkes |
| 2019/0051167 A1 | 2/2019 | Malkes |
| 2019/0051171 A1 | 2/2019 | Malkes |

OTHER PUBLICATIONS

U.S. Appl. No. 16/058,343 Office Action dated Nov. 19, 2018.
U.S. Appl. No. 16/030,396, William A. Malkes, System and Method Adaptive Controlling of Traffic Using Camera Data, filed Jul. 9, 2018.
U.S. Appl. No. 16/044,891, William A. Malkes, System and Method for Controlling Vehicular Traffic, filed Jul. 25, 2018.
U.S. Appl. No. 16/032,886, William A. Malkes, Adaptive Traffic Control Using Object Tracking and Identity Details, filed Jul. 11, 2018.
U.S. Appl. No. 16/058,106, William A. Malkes, System and Method for Managing Traffic by Providing Recommendations to Connected Objects, filed Aug. 8, 2018.
U.S. Appl. No. 16/059,814, William A. Malkes, Systems and Methods of Navigating Vehicles, filed Aug. 9, 2018.
U.S. Appl. No. 16/058,214, William A. Malkes, System and Method of Adaptive Traffic Management, filed Aug. 8, 2018.
U.S. Appl. No. 16/100,750, William A. Malkes, System and Method of Adaptive Traffic Management at an Intersection, filed Aug. 10, 2018.
U.S. Appl. No. 16/101,766, William A. Malkes, System and Method for Retail Revenue Based Traffic Management, filed Aug. 10, 2018.
U.S. Appl. No. 16/101,933, William A. Malkes, Adaptive Optimization of Navigational Routes Using Traffic Data, filed Aug. 13, 2018.
U.S. Appl. No. 16/058,343, William A. Malkes, System and Method of Adaptive Controlling of Traffic Using Zone Based Occupancy, filed Aug. 8, 2018.
Dehghan et al., Afshin; "Automatic Detection and Tracking of Pedestrians in Videos with Various Crowd Densities", Pedestrian and Evacuation Dynamics 2012.
Dubska et al.; "Automatic Camera Calibration for Traffic Understanding", bmva.org, 2014.
Grosser, Kari; "Smart Io T Technologies for Adaptive Traffic Management Using a Wireless Mes Sensor Network", Advantech Industrial Io T Blog, Feb. 3, 2017.
https://www.flir.com, 2018.
Halper, Mark; Smart Cameras Will Help Spokane Light It's World More Intelligently (Updated), LEDs Magazine, and Business/Energy/Technology Journalist, Apr. 19, 2017.
Heaton, Brian; "Smart Traffic Signals Get a Green Light", Government Technology Magazine, Feb. 15, 2012.
Kolodny, Lora; Luminar reveals sensors that could make self-driving cars safer than human, Techcrunch, Apr. 13, 2017.
McDermott, John; "Google's newest secret weaon for local ads", Digiday, Jan. 29, 2014.
Resnick, Jim; "How Smart Traffic Signals May Ease Your Commute", BBC, Autos, Mar. 18, 2015.
Sun et al., M.; "Relating Things and Stuff Via Object Property Interactions", cvgl.stanford.edu, Sep. 4, 2012.
Whitwam, Ryan; "How Google's self-driving cars detect and avoid obstacles", ExtremeTech, Sep. 8, 2014.
Yamaguchi, Jun'ichi; "Three Dimensional Measurement Using Fisheye Stereo Vision", Advances in Theory and Applications of Stereo Vision, Dr. Asim Bhatti (Ed.), ISBN:978-953-307-516-7, InTech. Jan. 8, 2011.

* cited by examiner

| Time Interval | Zone 1 Traffic Flow Rate (Vehicle/Min.) | Vehicle present at Zone 1 | Zone 2 Traffic Flow Rate (Vehicle/Min.) | Vehicle present at Zone 2 | Zone 3 Traffic Flow Rate (Vehicle/Min.) | Vehicle present at Zone 3 | Zone 4 Traffic Flow Rate (Vehicle/Min.) | Vehicle present at Zone 4 |
|---|---|---|---|---|---|---|---|---|
| 1 | 10 | Yes | 15 | Yes | 11 | Yes | 12 | Yes |
| 2 | 10 | Yes | 14 | Yes | 11 | Yes | 12 | Yes |
| 3 | 10 | Yes | 15 | Yes | 11 | Yes | 12 | Yes |
| 4 | 10 | Yes | 14 | Yes | 9 | Yes | 0 | No |
| 5 | 11 | Yes | 15 | Yes | 11 | Yes | 0 | No |
| 6 | 10 | Yes | 15 | Yes | 11 | Yes | 0 | No |
| 7 | 12 | Yes | 15 | Yes | 11 | Yes | 0 | No |
| ... | ... | ... | ... | ... | ... | ... | ... | ... |
| 11 | 12 | Yes | 14 | Yes | 11 | Yes | 0 | No |
| 12 | 10 | Yes | 14 | Yes | 11 | Yes | 8 | Yes |
| 13 | 10 | Yes | 14 | Yes | 11 | Yes | 11 | Yes |

Figure 5B

ADAPTIVE TRAFFIC OPTIMIZATION USING UNMANNED AERIAL VEHICLES

CROSS-REFERENCE TO RELATED APPLICATIONS

This application claims priority to U.S. Provisional Patent Application No. 62/545,257 filed on Aug. 14, 2017, the entire content of which is incorporated herein by reference.

FIELD OF THE DISCLOSURE

The present disclosure is generally related to traffic control systems, and more particularly related to adaptive traffic optimization using an Unmanned Aerial Vehicle (UAV).

BACKGROUND

Traffic congestion has continued to increase with rise in road traffic. Various efforts have been made to combat the traffic congestion, such as monitoring traffic conditions and providing the collected data to the individuals or traffic monitoring companies. The real-time information of the traffic conditions can be collected using, for example, fisheye cameras, or traffic road sensors. The traffic information however beneficial, lacks accurate comparative information, for example, the traffic information does not allow user to change paths based on the future traffic conditions.

Vehicular accidents are a major cause leading to traffic congestion. Current traffic management systems have little or no provisions for managing the traffic in cases of vehicular accidents and anomalous traffic congestion on roads.

Unmanned Aerial Vehicles (UAV) are becoming more and more popular as they have a diverse application area. Automated UAV equipped with camera capable of providing imagery during flight are already being used in delivery services as they are capable of storing navigation information and have capabilities of image recognition, for example, recognizing houses for delivery of packages. However, currently UAVs are not being utilized in traffic management system.

Thus, an improved traffic management system is required that could automatically utilize UAV for real-time management of traffic despite occurrence of the accidents and congestions.

SUMMARY

One or more example embodiments of inventive concepts are directed to providing adaptive traffic control mechanisms at an intersection (or a group of intersections in vicinity of each other), which may utilize one or more Unmanned Aerial Vehicles (UAVs).

One aspect of the present disclosure is a method of adaptive traffic control including receiving traffic data at an intersection; determining statistics associated with traffic at the intersection based on the traffic data; detecting an anomaly in the traffic based on the statistics; utilizing an unmanned aerial vehicle (UAV) to determine a root cause of the anomaly; and communicating an anomaly rule based on the root cause to a light controller to control traffic at the intersection.

One aspect of the present disclosure is a traffic controller with memory having computer-readable instructions stored thereon and one or more processors. The one or more processors are configured to execute the computer-readable instructions to receive traffic data at an intersection; determine statistics associated with traffic at the intersection based on the traffic data; detect an anomaly in the traffic based on the statistics; utilize an unmanned aerial vehicle (UAV) to determine a root cause of the anomaly; and communicate an anomaly rule based on the root cause to a light controller to control traffic at the intersection.

One aspect of the present disclosure includes one or more computer-readable medium having computer-readable instructions stored thereon, which when executed by one or more processors, cause the one or more processors to receive traffic data at an intersection; determine statistics associated with traffic at the intersection based on the traffic data; detect an anomaly in the traffic based on the statistics; utilize an unmanned aerial vehicle (UAV) to determine a root cause of the anomaly; and communicate an anomaly rule based on the root cause to a light controller to control traffic at the intersection.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIGS. 5A-C illustrate an example table of traffic statistics at an intersection;

DETAILED DESCRIPTION

Specific details are provided in the following description to provide a thorough understanding of embodiments. However, it will be understood by one of ordinary skill in the art that embodiments may be practiced without these specific details For example, systems may be shown in block diagrams so as not to obscure the embodiments in unnecessary detail. In other instances, well-known processes, structures and techniques may be shown without unnecessary detail in order to avoid obscuring embodiments.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Example embodiments of the present disclosure will be described more fully hereinafter with reference to the accompanying drawings in which like numerals represent like elements throughout the several figures. Example embodiments of the claims may, however, be embodied in many different forms and should not be construed as limited to the example embodiments set forth herein. The examples set forth herein are non-limiting examples and are merely examples among other possible examples.

Figure 1:
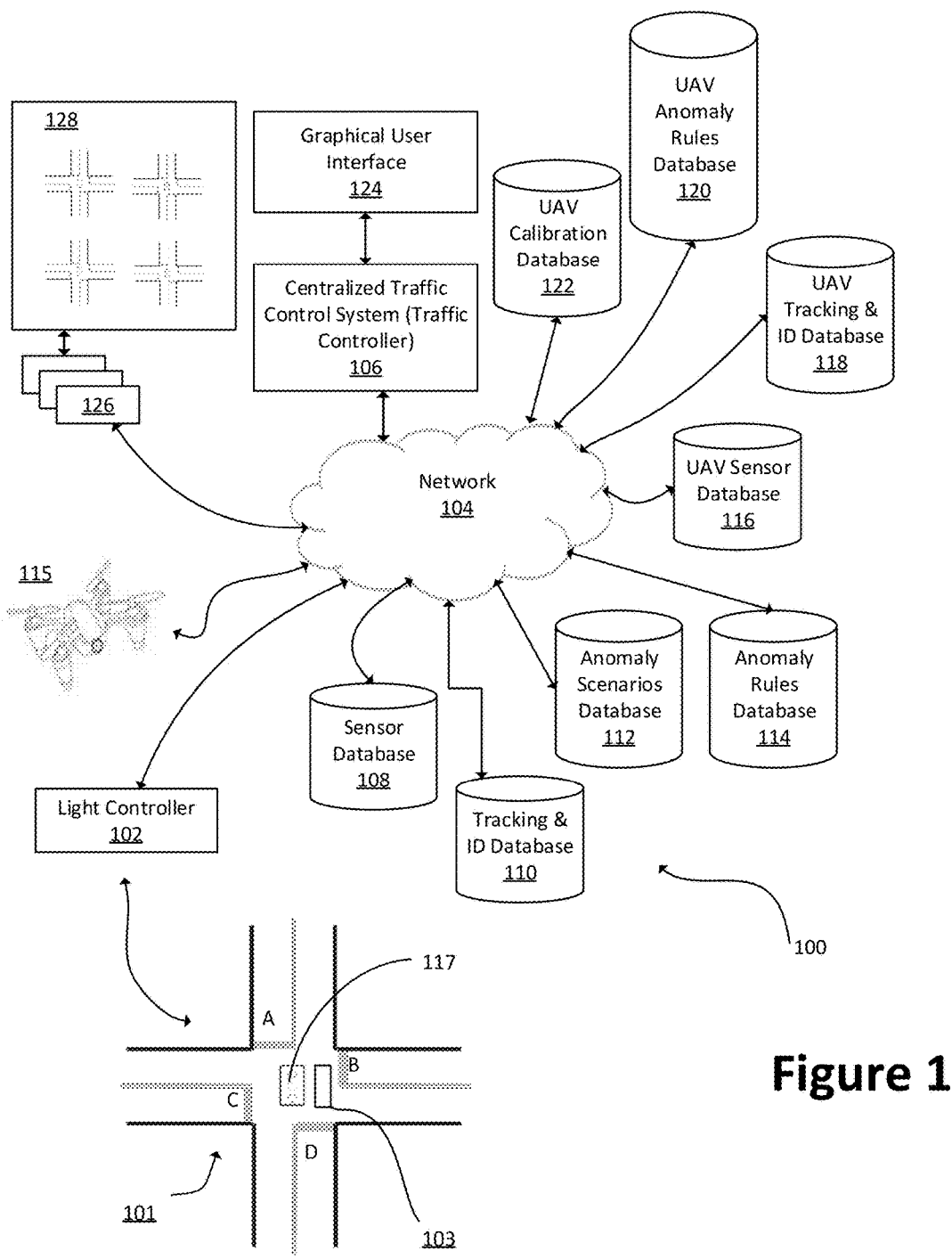
FIG. 1 illustrates a system for adaptive controlling of traffic.

FIG. 1 illustrates a system for adaptive controlling of traffic. The system 100 comprises various components including but not limited to, a traffic light controller 102 (hereinafter may be referred to as a light controller 102) associated with a smart traffic camera 103 and traffic light 117 installed at an intersection 101. Components of the traffic controller 102 will be further described with reference to FIG. 2. The traffic controller 102 may or may not be physically located near the smart traffic camera 103 or the traffic light 117. In one example embodiment, the traffic light 117 associated with the light controller 102 can have different traffic signals directed towards all the roads/zones leading to the intersection 101. The different signals may comprise a Red light, a Yellow light, and a Green light.

There may be more than one smart traffic camera 103 or one traffic light 117 installed at intersection 101. The smart traffic camera 103 may be one various types of cameras including, but not limited to, fisheye traffic cameras to detect and optimize traffic flows at the intersection 101 and/or at other intersections part of the same local network or corridor. The smart traffic camera 103 can be any combination of cameras or optical sensors, such as but not limited to fish-eye cameras, directional cameras, infrared cameras, etc. The smart traffic camera 103 can allow for other types of sensors to be connected to thereto (e.g., via various known or to be developed wired and/or wireless communication schemes) for additional data collection. The smart traffic camera 103 can collect video and other sensor data at the intersection 101 and convey the same to the traffic controller 102 for further processing, as will be described below.

The light controller 102 can manage and control traffic for all zones (directions) at which traffic enters and exits the intersection 101. Examples of different zones of the intersection 101 are illustrated in FIG. 1 (e.g., zones A, B, C and D). Therefore, while FIG. 1 only depicts a single smart traffic camera 103 and a single traffic light 117, there can be multiple ones of the smart traffic camera 103 and traffic lights 117 installed at the intersection 101 for managing traffic for different zones of the intersection 101.

The system 100 may further include network 104. The network 104 can enable the light controller 102 to communicate with a remote traffic control system 106 (which may be referred to as a centralized traffic control system or simply a traffic controller 106). The network 104 can be any known or to be developed cellular, wireless access network and/or a local area network that enables communication (wired or wireless) among components of the system 100. As mentioned above, the light controller 102 and the traffic controller 106 can communicate via the network 104 to exchange data, created traffic rules or control settings, etc., as will be described below.

The traffic controller 106 can be a centralized system used for managing and controlling traffic lights and conditions at multiple intersections (in a given locality, neighborhood, an entire town, city, state, etc.).

The traffic controller 106 can be communicatively coupled (e.g., via any known or to be developed wired and/or wireless network connection such as network 104) to one or more databases such as a sensor database 108 used to store data from the smart traffic camera 103 (and/or traffic sensor(s) 206, which will be discussed below with reference to FIG. 2) and a tracking and identity database 110 used to store data from tracking and identification of objects at the intersection 101. The traffic controller 106 may also be communicatively coupled to an anomaly scenario database 112 used to store data identified as an anomaly in traffic conditions at the intersection 101. The traffic controller 106 may also be communicatively coupled to an anomaly rules database 114 used to store parameters, defining traffic scenarios identified as potentially preceding (leading to) an anomaly. The use and functionality of these example databases will be further described below with reference to FIGS. 2-10.

The traffic controller 106 may also be connected to an Unmanned Aerial Vehicle (UAV) 115 via the communication network 104. To communicate with and manage control of the UAV 115, the traffic controller 106 may communicate with one or more additional databases such as a UAV sensor database 116 used to store data received from the UAV 115, a UAV tracking and identity database 118 used to store data, and a UAV anomaly rules database 120 used to store data identified as anomaly by the UAV 115. The traffic controller 106 may also be connected to a UAV calibration database 122 used to store pre-programmed data for navigating the UAV 115. In another example, the UAV sensor database 116, UAV tracking and identity database 118, the UAV anomaly rules database 120, and the UAV calibration database 122 may be present in a memory of the UAV 115 or combined with or embedded with one or more of the sensor database 108, tracking & ID database 110, anomaly scenario database 112 and anomaly rule database 114. For example, instead of sensor database 108 and UAV sensor database 116, the two may be combined to provide a single sensor database. The use and functionality of these example databases will be further described below with reference to FIGS. 2-10.

The UAV 115 may be any type of known, or to be developed, unmanned equipment capable of performing any type of known or to be developed data collection using known or to be developed cameras and sensors. The UAV 115 may be remotely controllable and/or fully autonomous.

While FIG. 1 illustrates a single UAV 115, the present disclosure is not limited thereto. There may be more than one UAV 115 utilized for traffic monitoring and adaptive control at the intersection 101 or any other intersection. For example, multiple UAVs 115 may be utilized simultaneously or overlappingly to monitor and collect traffic information in different zones or roads leading to different zones at the intersection 101.

The traffic controller 106 can provide a centralized platform for network operators to view and manage traffic conditions, set traffic control parameters and/or manually override any traffic control mechanisms at any given intersection. An operator can access and use the traffic controller 106 via a corresponding graphical user interface 124 after providing login credentials and authentication of the same by the traffic controller 106. The traffic controller 106 can be controlled, via the graphical user interface 124, by an operator to receive traffic control settings and parameters to apply to one or more designated intersections. The traffic controller 106 can also perform automated and adaptive control of traffic at the intersection 101 or any other associated intersection based on analysis of traffic conditions, data and statistics at a given intersection(s) using various algorithms and computer-readable programs such as known or to be developed machine learning algorithms. The components and operations of traffic controller 106 will be further described below with reference to FIGS. 2-10.

Traffic controller 106 can be a cloud based component running on a public, private and/or a hybrid cloud service/infrastructure provided by one or more cloud service providers.

The system 100 can also have additional intersections and corresponding light controllers associated therewith. Accordingly, not only the traffic controller 106 is capable of adaptively controlling the traffic at an intersection based on traffic data at that particular intersection but it can further adapt traffic control parameters for that particular intersection based on traffic data and statistics at nearby intersections communicatively coupled to the traffic controller 106.

As shown in FIG. 1, the light controllers 126 can be associated with one or more traffic lights at one or more of the intersections 128 and can function in a similar manner as the light controller 102 and receive anomaly rules and traffic control settings from the traffic controller 106 for managing traffic at the corresponding one of intersections 128. Alternatively, any one of the light controllers 124 can be a conventional light controller implementing pre-set traffic control settings at the corresponding traffic lights but configured to convey corresponding traffic statistics to the traffic controller 106.

The intersections 128 can be any number of intersections adjacent to the intersection 101, within the same neighborhood or city as the intersection 101, intersections in another city, etc.

In one or more examples, the light controller 102 and the traffic controller 106 can be the same (one component implementing the functionalities of both). In such example, components of each described below with reference to FIGS. 2 and 3 may be combined into one. Furthermore, in such example, the light controller 102 may be remotely located relative to the smart traffic camera 103 and the traffic light 117 and be communicatively coupled thereto over a communication network such as the network 104.

As mentioned above, the components of the system 100 can communicate with one another using any known or to be developed wired and/or wireless network. For example, for wireless communication, techniques such as Visible Light Communication (VLC), Worldwide Interoperability for Microwave Access (WiMAX), Long Term Evolution (LTE), Fifth Generation (5G) cellular, Wireless Local Area Network (WLAN), Infrared (IR) communication, Public Switched Telephone Network (PSTN), Radio waves, and other communication techniques known, or to be developed, in the art may be utilized.

While certain components of the system 100 are illustrated in FIG. 1, inventive concepts are not limited thereto and the system 100 may include any number of additional components necessary for operation and functionality thereof.

Having described components of an example system 100, the disclosure now turns to description of one or more examples of components of the light controller 102 and the traffic controller 106.

Figure 2:
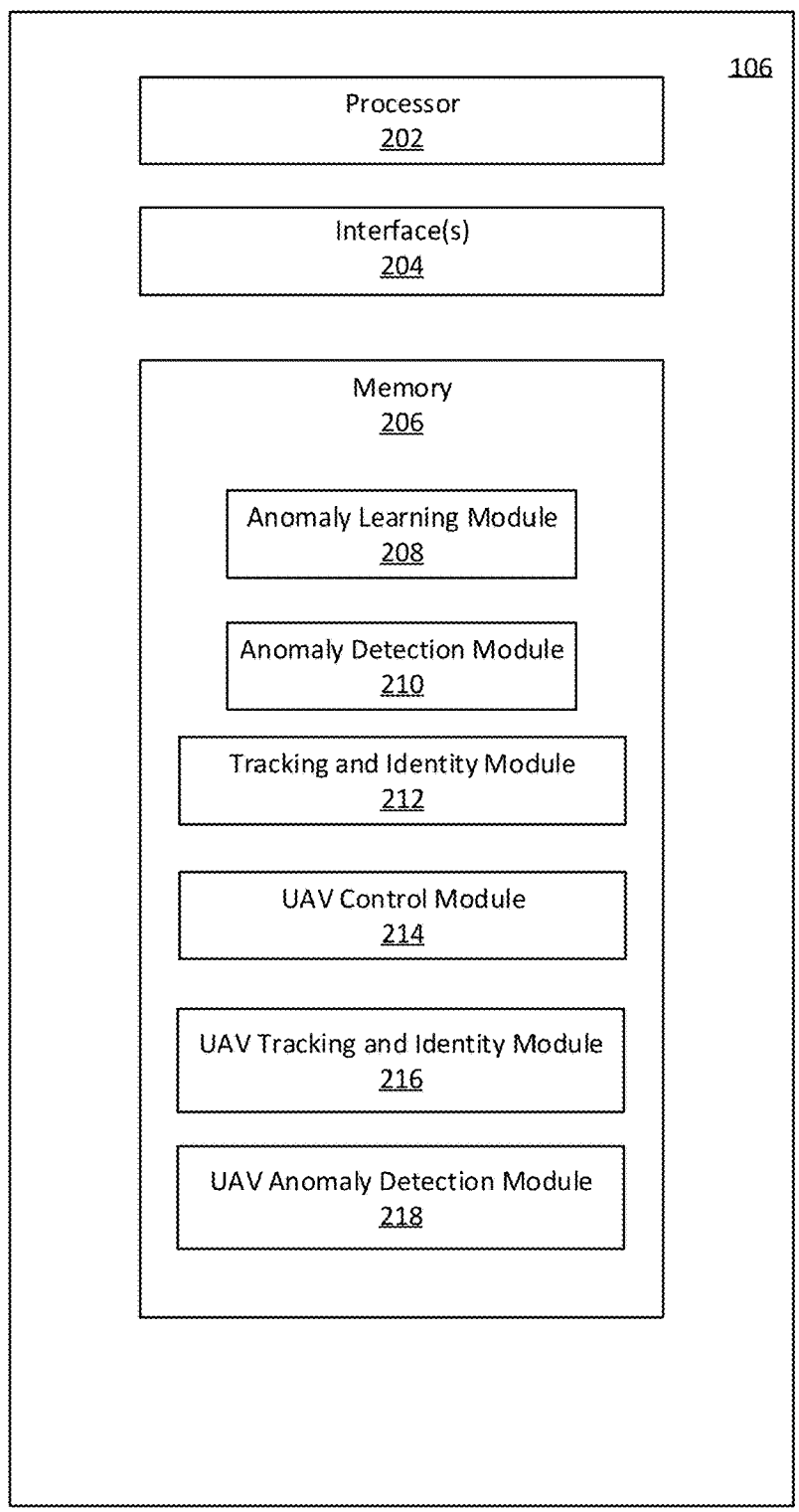
FIG. 2 is a block diagram showing different components of the traffic controller of FIG. 1.

FIG. 2 is a block diagram showing different components of the traffic controller of FIG. 1.

The traffic controller 106 can comprise one or more processors such as a processor 202, interface(s) 204 and one or more memories such as a memory 206. The processor 202 may execute an algorithm stored in the memory 206 for adaptive traffic control based on detection of anomalies, as will be described below. The processor 202 may also be configured to decode and execute any instructions received from one or more other electronic devices or server(s). The processor 202 may include one or more general purpose processors (e.g., INTEL® or Advanced Micro Devices® (AMD) microprocessors, ARM) and/or one or more special purpose processors (e.g., digital signal processors, Xilinx® System On Chip (SOC) Field Programmable Gate Array (FPGA) processor and/or, and/or Graphics Processing Units (GPUs)). The processor 202 may be configured to execute one or more computer-readable program instructions, such as program instructions to carry out any of the functions described in this description.

The interface(s) 204 may assist an operator in interacting with the traffic controller 106. The interface(s) 204 of the traffic controller 106 can be used instead of or in addition to the graphical user interface 124 described above with reference to FIG. 1. In another example, the interface(s) 204 can be the same as the graphical user interface 124. The interface(s) 204 either accept an input from the operator or provide an output to the operator, or may perform both the actions. The interface(s) 204 may either be a Command Line Interface (CLI), Graphical User Interface (GUI), voice interface, and/or any other user interface known in the art or to be developed.

The memory 206 may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The memory 206 may include computer-readable instructions, which when executed by the processor 202 cause the traffic controller 106 to perform adaptive traffic control based on anomaly detection in traffic patterns. The computer-readable instructions stored in the memory 206 can be identified as anomaly learning module (service) 208, anomaly detection module (service) 210, tracking and identity (ID) module (service) 212, UAV control module (service) 114, UAV tracking and identity module (service) 216 and UAV anomaly detection module 218. The functionalities of each of these modules, when executed by the processor 202 will be further described below with reference to FIGS. 2-10, FIG. 3 is a block diagram showing different components of the light controller of FIG. 1. As mentioned above, the light controller 102 can be physically located near the smart traffic camera 103 and/or the traffic light 117 (e.g., at a corner of the intersection 101) or alternatively can communicate with the smart traffic camera 103 and/or the traffic light 117 wirelessly or via a wired communication scheme (be communicatively coupled thereto).

The light controller 102 can comprise one or more processors such as a processor 302, interface(s) 304, sensor(s) 306, and one or more memories such as a memory 308. The processor 302 may execute an algorithm stored in the memory 308 for adaptive traffic control, as will be described below. The processor 302 may also be configured to decode and execute any instructions received from one or more other electronic devices or server(s). The processor 302 may include one or more general purpose processors (e.g., INTEL® or Advanced Micro Devices® (AMD) microprocessors, ARM) and/or one or more special purpose processors (e.g., digital signal processors, Xilinx® System On Chip (SOC) Field Programmable Gate Array (FPGA) processor and/or, and/or Graphics Processing Units (GPUs)). The processor 302 may be configured to execute one or more computer-readable program instructions, such as program instructions to carry out any of the functions described in this description.

The interface(s) 304 may assist an operator in interacting with the light controller 102. The interface(s) 304 of the light controller 102 may be used instead of or in addition to the graphical user interface 124 described with reference to FIG. 1. In one example, the interface(s) 304 can be the same as the graphical user interface 124. The interface(s) 304 either accept an input from the operator or provide an output to the operator, or may perform both actions. The interface(s) 304 may either be a Command Line Interface (CLI), Graphical User Interface (GUI), voice interface, and/or any other user interface known in the art or to be developed.

The sensor(s) 306 can be one or more smart cameras such as fish-eye cameras mentioned above or any other type of sensor/capturing device that can capture various types of data (e.g., audio/visual data) regarding activities and traffic patterns at the intersection 101. Any one such sensor 306 can be located at the intersection 101 and coupled to the traffic controller 102 and/or the traffic light 117.

As mentioned, the sensor(s) 306 may be installed to capture objects moving across the roads. The sensor(s) 306 used may include, but are not limited to, optical sensors such as fish-eye camera mentioned above, Closed Circuit Television (CCTV) camera and Infrared camera. Further, sensor(s) 306 can include, but not limited to induction loops, Light Detection and Ranging (LIDAR), radar/microwave, weather sensors, motion sensors, audio sensors, pneumatic road tubes, magnetic sensors, piezoelectric cable, and weigh-in motion sensor, which may also be used in combination with the optical sensor(s) or alone.

The memory 308 may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The memory 308 may include computer-readable instructions, which when executed by the processor 302 cause the light controller 102 to perform adaptive traffic control based on anomaly detection in traffic patterns. The computer-readable instructions stored in the memory 308 can be identified as traffic anomaly control module (service) 310 and traffic light control module (service) 312. The functionalities of each of these modules, when executed by the processor 302 will be further described below with reference to FIG. 10.

As mentioned above, light controller 102 and traffic controller 106 may form a single physical unit, in which case system components of each, as described with reference to FIGS. 1 to 3 may be combined into one (e.g., all example modules described above with reference to FIGS. 2 and 3 may be stored on a single memory such as the memory 206 or the memory 308).

While certain components have been shown and described with reference to FIGS. 2 and 3, the components of the light controller 102 and/or the traffic controller 106 are not limited thereto, and can include any other component for proper operations thereof including, but not limited to, a transceiver, a power source, etc.

Figure 3:
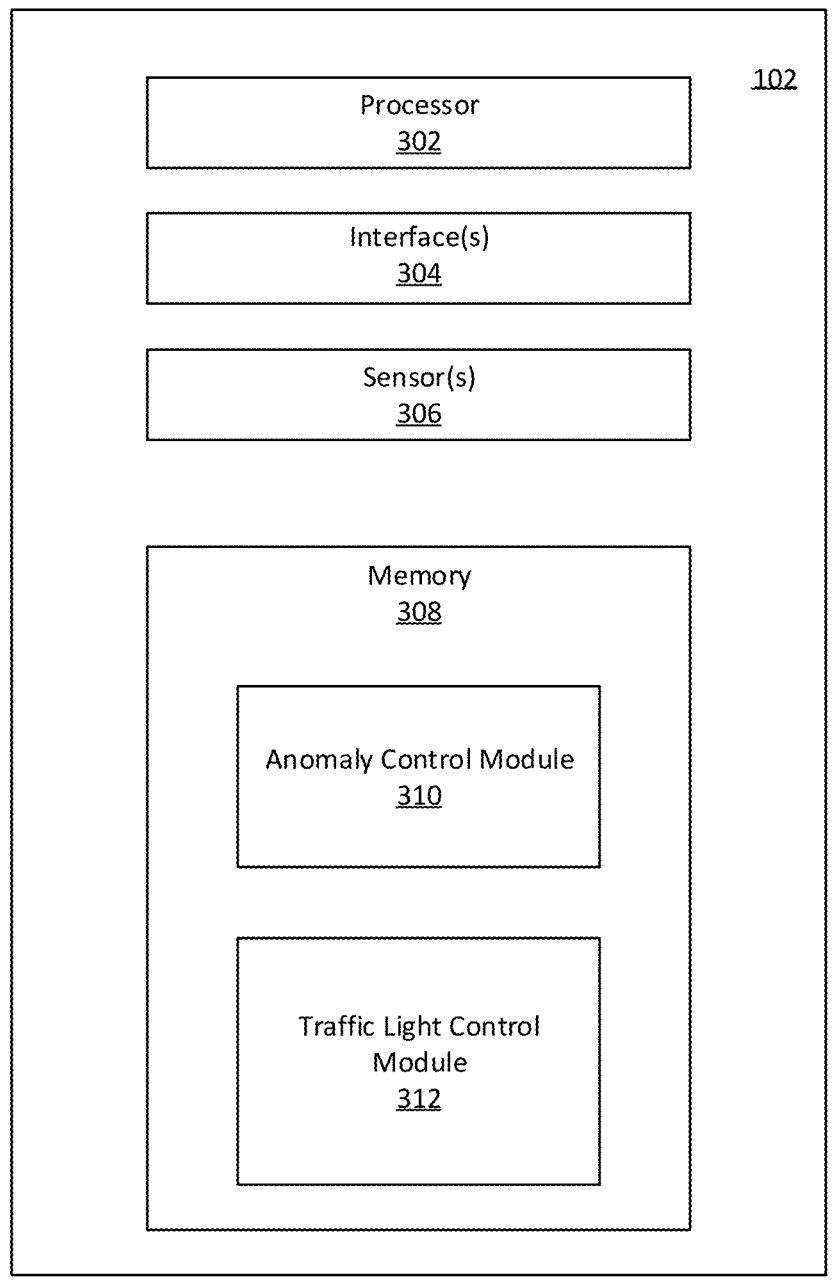
FIG. 3 is a block diagram showing different components of the light controller of FIG. 1

Having described an example system and example components of one or more elements thereof with reference to FIGS. 1-3, the disclosure now turns to the description of examples for detecting anomalies in traffic patterns and adaptive traffic control based thereon.

Example embodiments, which will be described below with reference to FIGS. 2-10, enable the traffic controller 106 to detect anomalies (traffic anomalies) in traffic conditions/flows at the intersection 101. This detection of traffic anomalies may be based on utilization of UAVs such as the UAV 115.

For example, an anomaly may be a sudden drop in a rate of traffic flow at the intersection 101 due to any number of reasons including an accident, weather conditions, a sudden emergency, a nearby event, etc. This drop in traffic flow rate may be coupled with factors that prevent a proper detection of the root cause of the drop in the traffic flow rate. For example, simultaneous with the detection of a traffic flow rate of 0 vehicles per minute in one or more zones at the intersection 101, the traffic controller 106 also detects that no vehicles are present in the one or more zones. This may be due to for example, accidents upstream or downstream from the corresponding zone at the intersection 101 (such as at a nearby or neighboring intersection(s)). Therefore, smart cameras and sensors at the intersection 101 may not be sufficient to detect such anomaly and causes thereof. Instead, the UAV 115 may be used to augment the use of sensors and smart cameras at the intersection 101 to identify the upstream or downstream accidents and hence provide a more complete analysis and ultimately a better control of traffic at the intersection 101.

Figure 4:
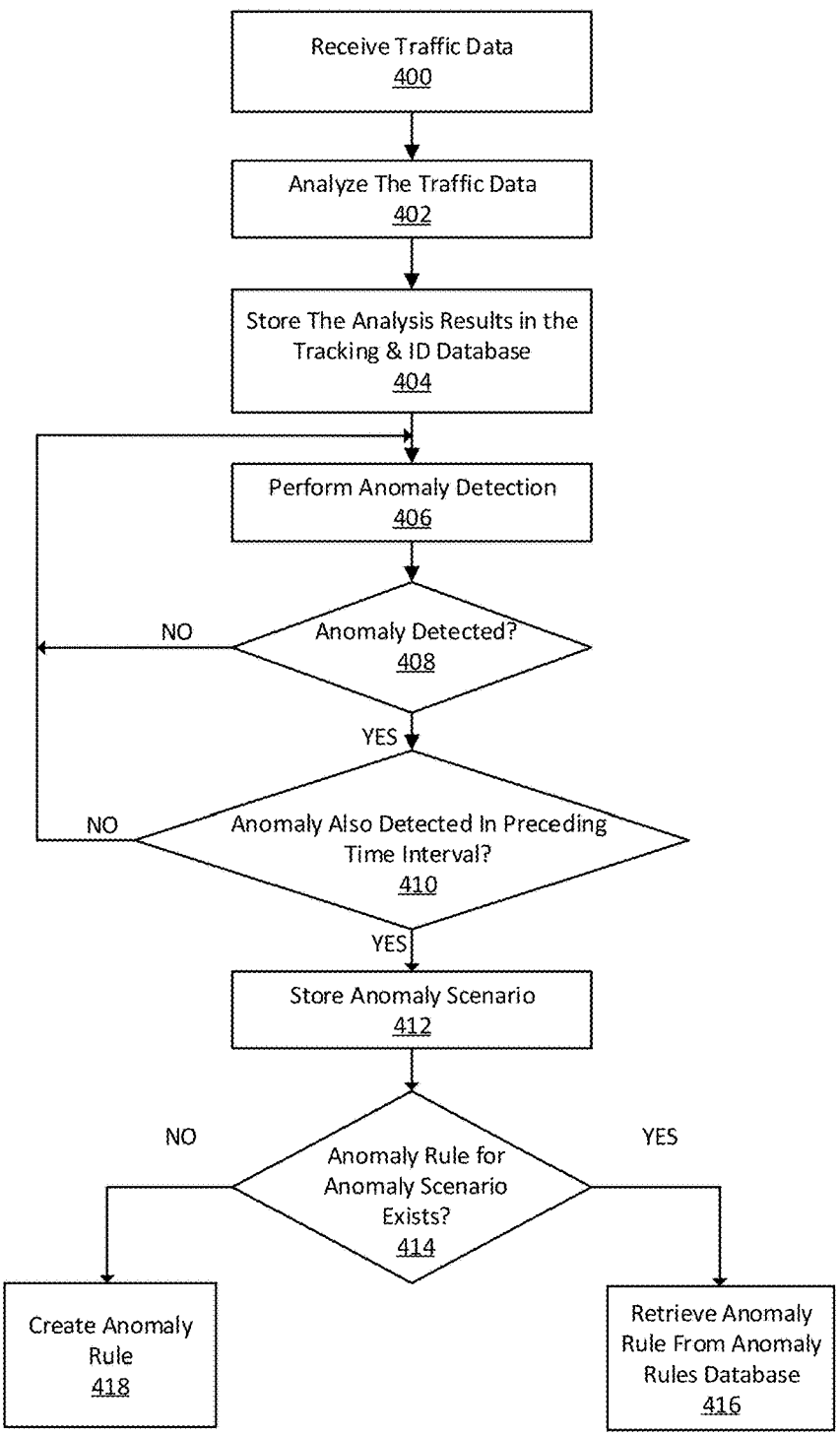
FIG. 4 illustrates a flowchart showing a method executed by the traffic controller of FIG. 1.

Hereinafter, the process of detecting anomalies and establishing rules therefore by the traffic controller 106 will be described. FIG. 4 illustrates a flowchart showing a method executed by the traffic controller of FIG. 1. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed example embodiments.

Furthermore, FIG. 4 will be described from the perspective of the traffic controller 106. However, it will be understood that the functionalities of the traffic controller 106 are implemented by the processor 202 executing computer-readable instructions stored on the memory 206 described with reference to FIG. 2.

At step 400, the traffic controller 106 may receive traffic data corresponding to the traffic flow at the intersection 101. The traffic data may be captured by the smart traffic camera 103 and/or sensor(s) 306 as described above and transmitted to the traffic controller 106. The traffic data can include, but is not limited to, audio, video and image data corresponding to traffic flowing through the intersection 101. In one example, the traffic data is continuously captured and stored in the sensor database (video data database) 108 and is subsequently retrieved from the sensor database 108 by the traffic controller 106. Alternatively, the traffic data stored in the sensor database 108 is automatically fetched to the traffic controller 106 every predetermined period of time (e.g., where the period of time is a configurable parameter determined based on experiments and/or empirical studies, provided by an operator via the graphical user interface 124, etc.).

At step 402, the traffic controller 106 may analyze the traffic data to identify and track statistics/traffic conditions (e.g., object types) at the intersection 101. The traffic controller 106 may perform the analysis by executing the computer-readable instructions corresponding to the tracking and ID module 212. The detection of the types of objects can be based on any known or to be developed method of detecting and tracking objects using image/video processing. The types of objects may include, but are not limited to, pedestrians and various types of transportation means (vehicles) such as cars, trucks, buses, bikes, etc. Furthermore, cars, trucks, buses and bikes can further be broken down into sub-categories. For example, cars can be categorized into sedans, vans, SUVs, etc. Trucks can be categorized into light trucks such as pickup trucks, medium trucks such as box trucks or fire trucks, heavy duty trucks such as garbage trucks, crane movers, 18-wheelers, etc.

Other examples of statistics obtained based on the analysis at step 402 include an average traffic flow rate for an interval of time, light phases for each zone during the interval of time and types of objects in each zone during the same time interval, positions (e.g., x, y and z coordinates) of detected vehicles, etc.

In one or more examples, the traffic controller 106 can store other data in association with the statistics including, but not limited to, time and date, weather conditions, scheduled road maintenances, scheduled events taking place in the vicinity of the intersection 101, etc. The additional information may be obtained from external sources and used in determining anomalies such as the example described above.

At step 404, the traffic controller 106 may store the results of the analysis at step 402 in the tracking and ID database 110 described above with reference to FIG. 1.

Figure 5A:
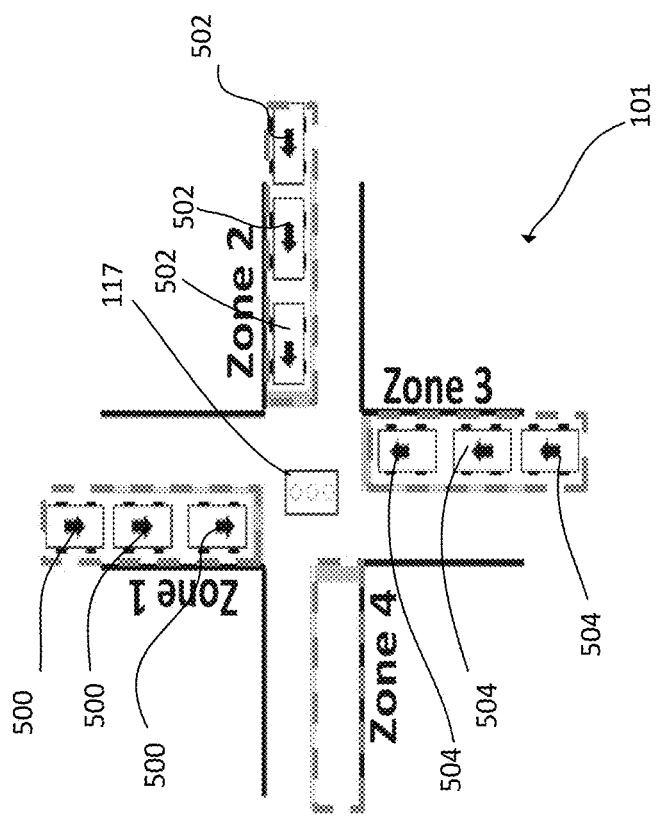
Figure 5C:

FIGS. 5A-C illustrate an example table of traffic statistics at an intersection. FIG. 5A is an example traffic condition for four example zones at the intersection 101, namely zones 1, 2, 3 and 4 (which may correspond to zones A, B, C and D of the intersection 101, respectively, as shown in FIG. 1), with vehicles 500 in zone 1, vehicles 502 in zone 2, vehicles 504 in zone 3 and no vehicle in zone 4. FIG. 5B illustrates a table 510. Table 510 illustrates examples of statistics resulting from the analysis of step 402 stored in a tabular format in the tracking and ID database 110.

In the example table 500, statistics associated with the traffic at the intersection 101 are collected for 2-minute time intervals for zones 1, 2, 3 and 4 at the intersection 101. The statistics, as shown, include average flow rate (traffic flow rate) each of the zones 1, 2, 3 and 4 as well as whether vehicles are present in these zones in the corresponding time intervals or not. In one example, the table 510 is continuously updated with traffic statistics for a given time interval as new traffic data are received and analyzed at steps 400 and 402.

Referring back to FIG. 4, at step 406, the traffic controller 106 may perform anomaly detection to detect an anomaly in the traffic at the intersection 101. In one example, by analyzing the data stored in the tracking and ID database 110, the traffic controller 106 may determine if a traffic flow rate over a given interval of time is equal to or less than a threshold (e.g., equal to or less than 2 vehicles per minute). The threshold may be a configurable parameter determined based on experiments and/or empirical studies. FIG. 5 also illustrates an example detected anomaly 512 or anomaly scenario 512. A dose read of the statistics for time intervals 4-11 reveals that in these time intervals and for zone 4, the rate of traffic flow is zero (0) while no vehicle is present in zone 4 during these time intervals. This may be indicative of an anomaly such as an accident on a road leading to by prior to reaching zone 4.

At step 408, the traffic controller 106 determines if an anomaly is detected at step 406. If an anomaly is not detected, then the process reverts back to step 406 and the traffic controller proceeds to analyzing the next time interval for possible anomalies. However, if at step 408, the traffic controller 106 determines that an anomaly is detected, then at step 410, the traffic controller 106 determines if the detected anomaly has also been detected for at least one preceding time interval (e.g., two preceding consecutive time intervals).

In one example, the traffic controller 106 may perform steps 406 and/or 408 by executing the computer-readable instructions corresponding to the anomaly learning module 208.

For example and with reference to FIG. 5, the traffic controller 106 has determined an anomaly for the time interval 4 at zone 4 (e.g., average traffic flow rate of 0 with no vehicles present in zone 4, which is equal to or less than the example threshold of 10 vehicles per minute). However, this anomaly was not detected for the time interval 3. However, for each of time intervals 5-11, the traffic controller 106 determines that for at least one preceding time interval, the same anomaly has been detected as well.

If at step 410, the traffic controller 106 determines that the anomaly detected at steps 406/408, is not detected for at least one preceding time interval (e.g., for a total of at least two consecutive time intervals), the process reverts back to step 406 and the traffic controller 106 proceeds to analyzing the next time interval for possible anomalies.

However, if at step 410, the traffic controller 106 determines that the anomaly detected at steps 406/408 has been present for at least one preceding time interval (e.g., example of anomaly 512), then at step 412, the traffic controller 106 stores the statistics of the anomaly (e.g., traffic statistics associated with time intervals 4-11 or a summarized version thereof such as statistics associated with zone 4 since it is the only zone for which the anomaly 512 is detected) in the anomaly scenarios database 112.

At step 414, the traffic controller 106 may determine if a rule for the anomaly scenario of step 412 already exists in the anomaly rules database 114. The traffic controller 106 can make the determination for an existing rule at step 414 by comparing the anomaly scenario of step 412 to previous anomaly scenarios associated with existing rules stored in the anomaly rules database 114.

If a match is found, then at step 416, the traffic controller 106 may retrieve the existing rule as the rule corresponding to the anomaly scenario of step 412. However, if a match is not found, then at step 418, the traffic controller 106 may create a new rule for the anomaly scenario of step 412.

Existing rules or newly created rules may be user defined (e.g., via the graphical user interface 124 of FIG. 1) or may be automatically determined by the traffic controller 106 using statistical analysis and machine learning tools and algorithms.

For example, a rule may be automatically defined by the traffic controller 106 that whenever the conditions of the example anomaly scenario 512 is detected, UAV 115 be launched to examine and detect the root cause of the absence of vehicles or objects in zone 4, which has resulted in a traffic flow rate of 0 vehicles per minute. Table 520 of FIG. 5C illustrates an example table of traffic rules stored in the anomaly traffic rules database 114. For example, a traffic rule may be that for zone 4, whenever the traffic flow rate is less than 2 vehicles per minute and no vehicles are present in zone 4, then UAV 115 is to be launched. However, for zones and traffic flow rates of less than 2 vehicles per minute where vehicles are present, the UAV 115 is not be launched but instead traffic signals at the intersection 101 are to be adjusted to optimize the traffic at the intersection 101. For example, such rule may be that signals for the zone 4 are to be extended by an additional 20 seconds to decrease the traffic congestion approaching the intersection 101 from the zone 4, direct objects 502 in the zone 2 to make a left turn or right turn to avoid going straight, etc.

Figure 6:
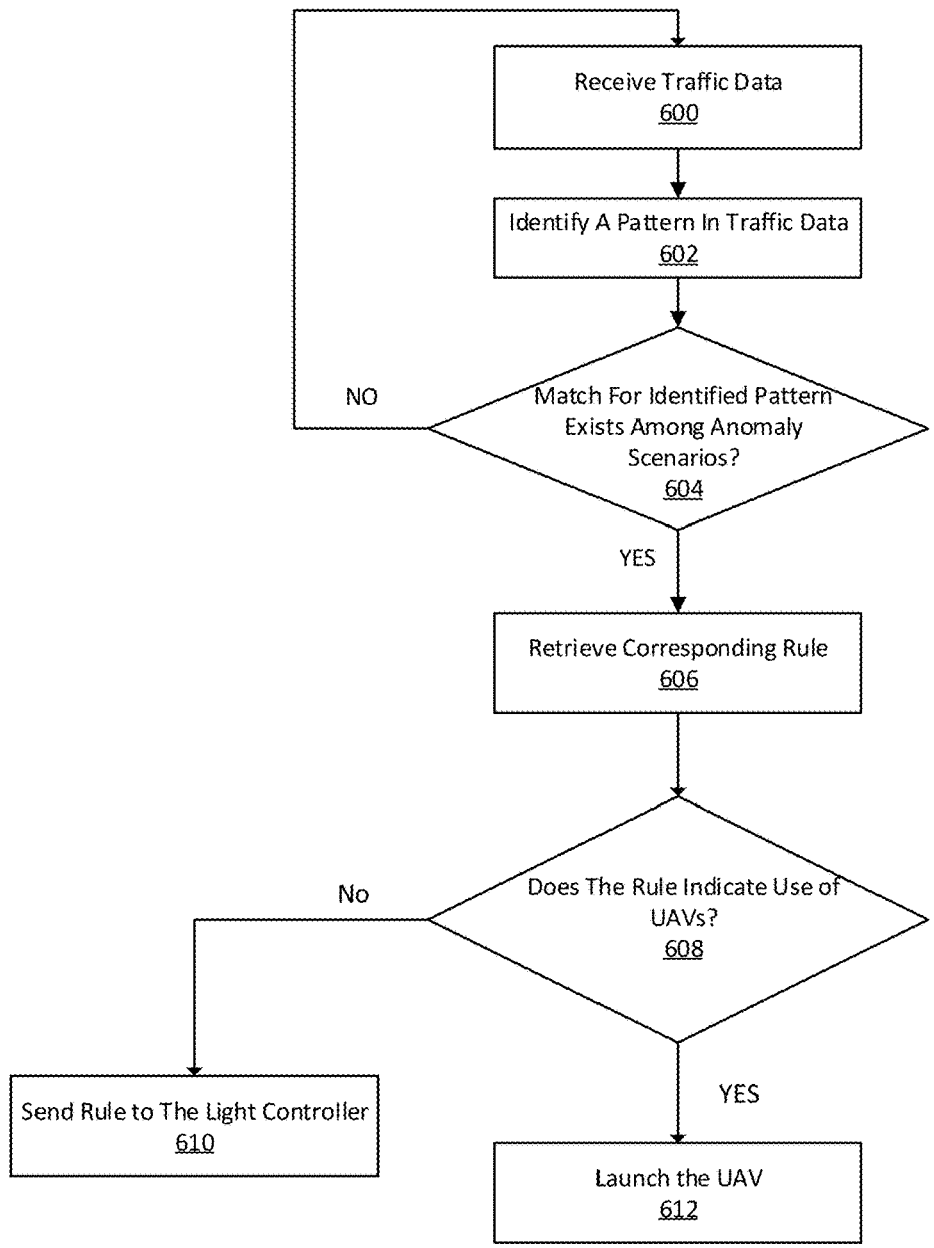
FIG. 6 illustrates a flowchart showing a method executed by the traffic controller of FIG. 1.

With examples having been described for detecting anomalies and recording anomaly scenarios as well as creating and/or retrieving corresponding rules, the disclosure now turns to FIG. 6 for applying anomaly rules.

FIG. 6 illustrates a flowchart showing a method executed by the traffic controller of FIG. 1. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed example embodiments.

Furthermore, FIG. 6 will be described from the perspective of the traffic controller 106. However, it will be understood that the functionalities of the traffic controller 106 are implemented by the processor 202 executing computer-readable instructions stored on the memory 206 described with reference to FIG. 2.

At step 600, the traffic controller 106 may receive traffic data in a similar manner as described above with reference to step 400 of FIG. 4.

At step 602, the traffic controller 106 may identify a pattern in the traffic data. In one example, the traffic controller 106 identifies the pattern for the traffic data over a time interval. Duration of the time interval may be the same as the duration of time intervals for which data is stored in table 510 of FIG. 5. In one example, the traffic controller 106 may identify the pattern over at least two or more time intervals. The pattern may include information such as, but not limited to, average traffic flow rate through the intersection 101 over the time interval(s), average traffic flow rate through each zone of the intersection 101 over the time interval(s), whether vehicles are detected in such zones, types of vehicles/objects at the intersection 101 or different zones thereof, etc.

In one example, the traffic controller 106 may perform steps 602 by executing the computer-readable instructions corresponding to the anomaly detection module 210.

At step 604, the traffic controller 106 determines if a match for the identified pattern of step 602 exists among the anomaly scenarios stored in the anomaly scenario database 112.

If a match does not exist, the process returns to step 600 and the traffic controller 106 repeats steps 600, 602 and 604. However, if a match is identified at step 604, then at step 606, the traffic controller 106 retrieves a corresponding anomaly rule (traffic rule or simply the rule) for the matched anomaly scenario from the anomaly rules database 114. The retrieved rule can include information regarding use of UAV 115 for determining root cause(s) of an anomaly. The retrieved rule can also include parameters and specifications of control settings (e.g., light phase for each zone and duration thereof) to be applied to the traffic light(s) 117 for managing light phases at different zones of the intersection 101 to prevent future occurrences of the corresponding anomaly.

At step 608, the traffic controller 106 determines if the retrieved rule requires the use of a UAV. If not, then at step 610, the retrieved traffic rule is sent to the light controller 102 to be implemented at the traffic light 117.

However, if at step 608, the traffic controller 106 determines that the rule indicates that a UAV is to be utilized, then at step 612, the traffic controller 106 communicates (e.g., over the network 104) with the UAV 115 to launch the UAV 115 to determine the root cause of the detected anomaly. The process of launching and utilizing the UAV 115 will be described below with reference to FIG. 7.

Figure 7:
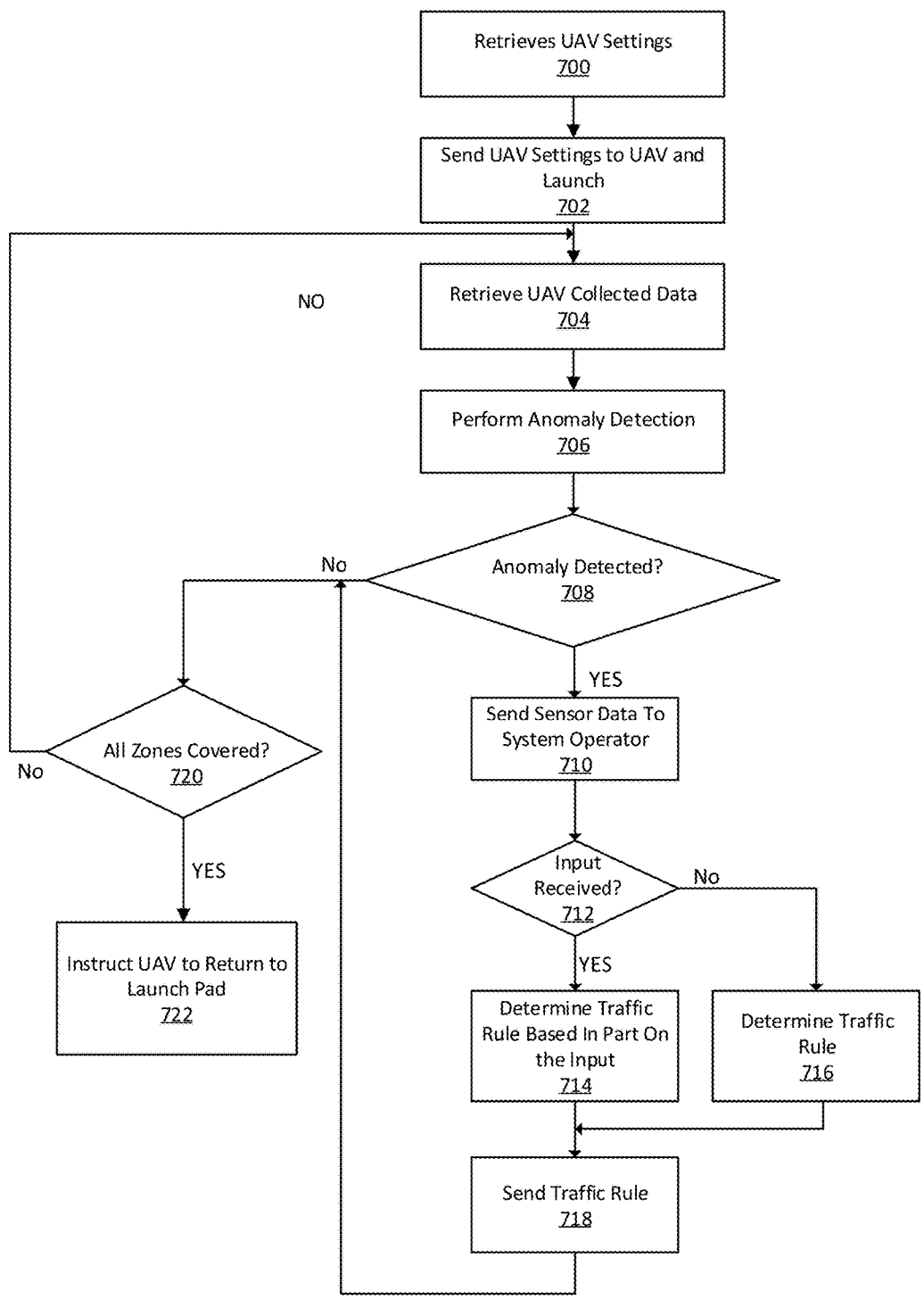
FIG. 7 illustrates a flowchart showing a method executed by the traffic controller of FIG. 1 to utilize a UAV to detect root cause(s) of an anomaly.

FIG. 7 illustrates a flowchart showing a method executed by the traffic controller of FIG. 1 to utilize a UAV to detect root cause(s) of an anomaly. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed example embodiments.

Furthermore, FIG. 7 will be described from the perspective of the traffic controller 106. However, it will be understood that the functionalities of the traffic controller 106 are implemented by the processor 202 executing computer-readable instructions stored on the memory 206 described with reference to FIG. 2.

Figure 8:
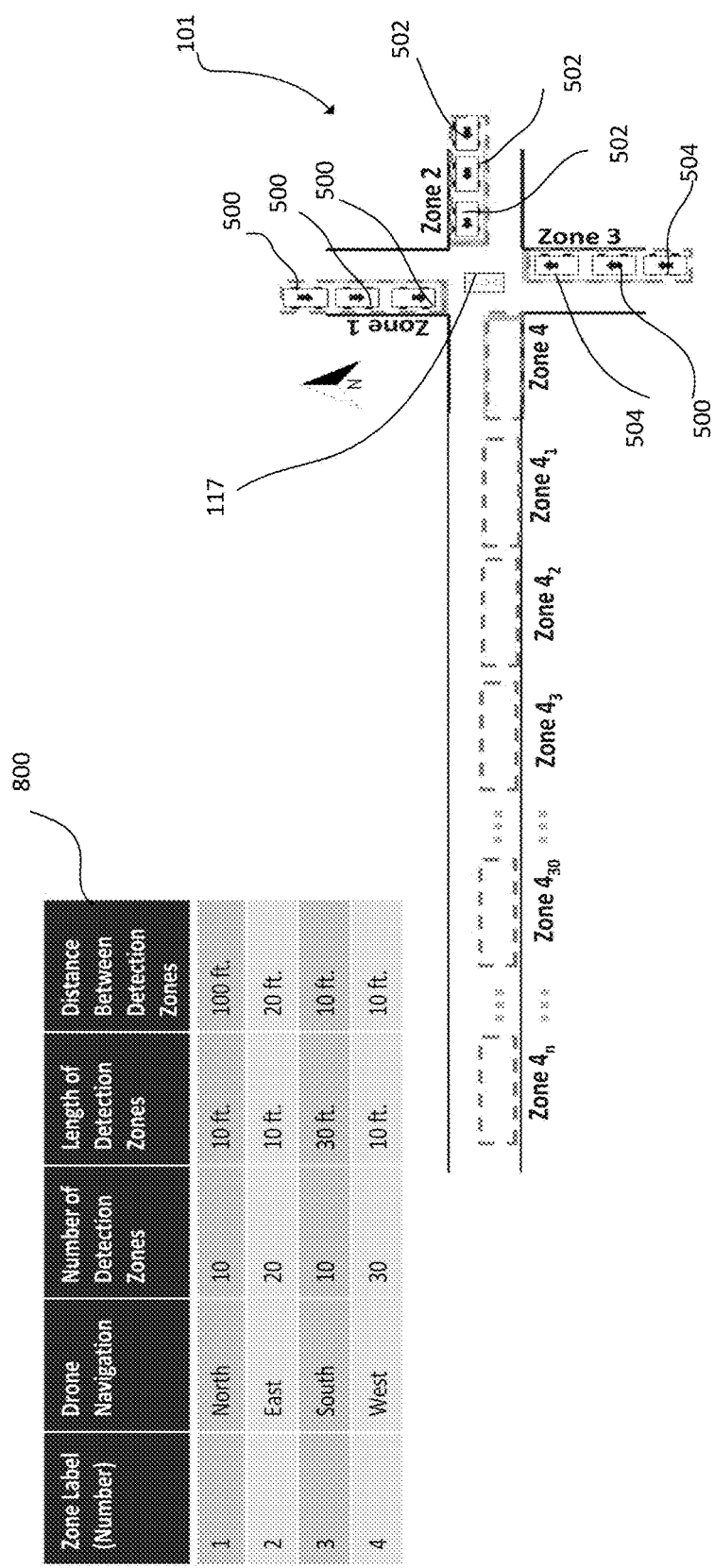
FIG. 8 illustrates an example table of settings for a UAV.

At step 700, the traffic controller 106 retrieves settings for the UAV 115 from the UAV calibration database 122. The settings may be for a particular zone of the intersection 101. FIG. 8 illustrates an example table of settings for a UAV. The intersection 101 with zones 1, 2, 3 and 4 are shown in FIG. 8. Furthermore and consistent with FIG. 5, while zones 1, 2 and 3 have objects (vehicles) 500, 502 and 504 present therein, respectively, zone 4 is empty. However, as part of settings for zone 4, FIG. 8 also shows a series of target zones that are formed prior to reaching zone 4. These target zones are zones to be monitored by the UAV 115 upon launch. These target zones are identified as zones $4_1, 4_2 \ldots 4_n$, where n is an integer greater than 1. Furthermore, FIG. 8 illustrates table 800, which includes settings for the UAV 115 depending on the zone for which it is going to be launched. For example, for zone 4, the UAV 115 is to navigate west, with 10 target zones (e.g., zones $4_1, 4_2 \ldots 4_{10}$), where each target zone is 10 feet long and there is at least 10 feet between every two adjacent target zones.

The settings and zones described with reference to FIG. 8 are just examples and are non-limiting. These settings may be determined automatically or specified by an operator via the GUI 124 of FIG. 1, for example.

At step 702, the traffic controller 106 sends (over the network 104) the retrieved UAV settings to the UAV 115 and launches the UAV according to any known, or to be developed, method of operating the UAV 115, such as settings for full autonomous launch and operation of the UAV 115. In response to the launch, the UAV 115 starts monitoring, using onboard sensors, cameras, etc., traffic data for each target zone. The data collected by the UAV 115 may be referred to as the UAV collected data. The data may be stored in the UAV sensor database 116.

In one example, the traffic controller 106 performs steps 700 and 702 by executing computer-readable instructions corresponding to the UAV control module 214 and/or the UAV tracking and identity module 216 stored on the memory 206 of the traffic controller 106.

Figure 9:
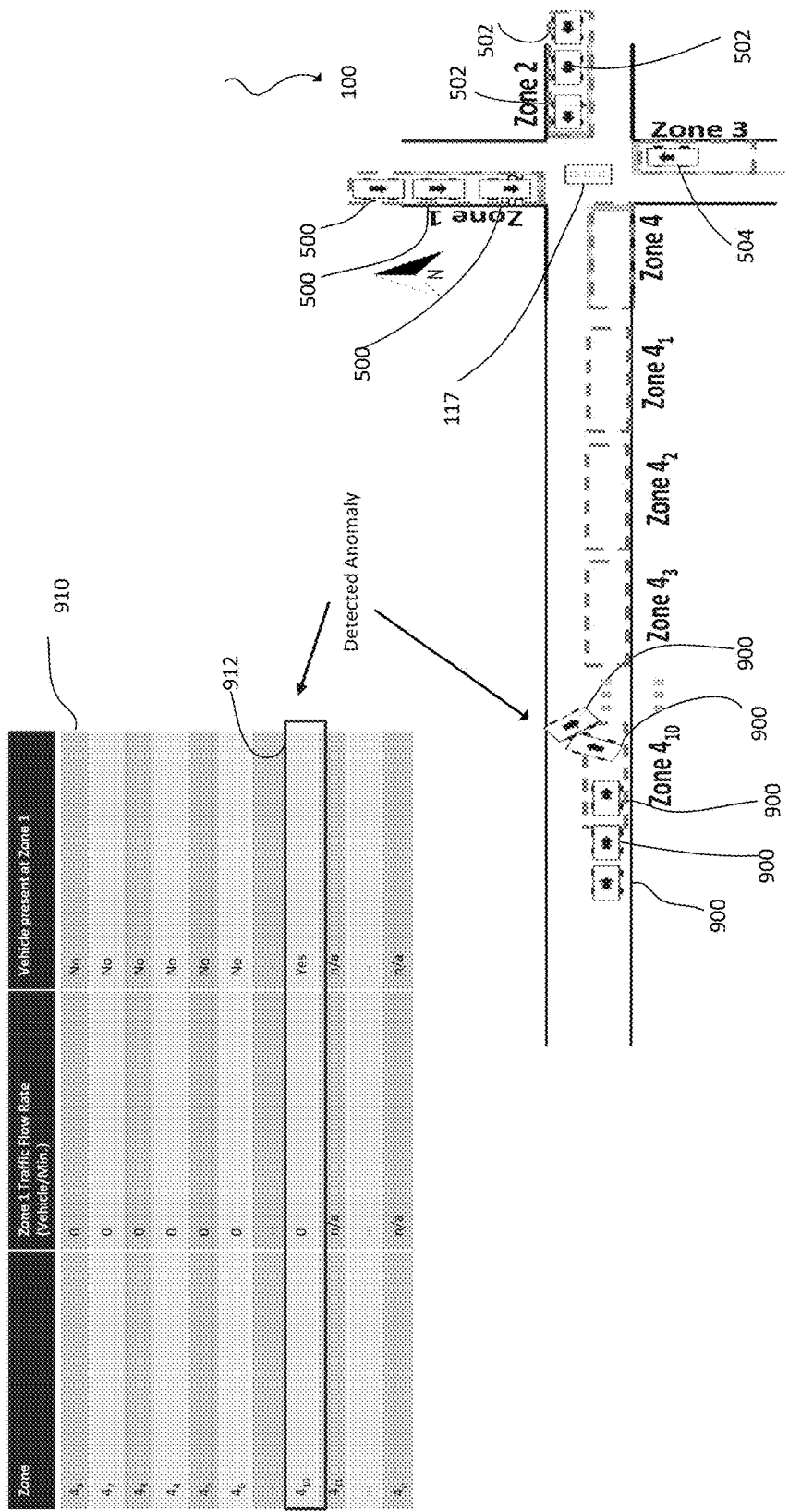
FIG. 9 illustrates an example table of UAV collected data.

At step 704, the traffic controller retrieves the UAV collected data either directly from the UAV 115 or from the UAV sensor database 116. FIG. 9 illustrates an example table of UAV collected data. The intersection 101 with zones 1, 2, 3 and 4 are shown in FIG. 9. Furthermore and consistent with FIG. 5, while zones 1, 2 and 3 have objects (vehicles) 500, 502 and 504 present therein, respectively, zone 4 is empty. However, as a result of the launch of the UAV and monitoring of the target zones $4_1 \ldots 4_{10}$, FIG. 9 illustrates vehicles or objects 900 being detected in the target zone $4_{10}$. This data is also shown in table 910 in FIG. 9.

At step 706, the traffic controller 106 performs an anomaly detection on the retrieved UAV collected data. The traffic controller 106 may store the results of the anomaly detection in the UAV tracking and identification database 118. In one example, the traffic controller 106 performs step 706 by executing computer-readable instructions corresponding to the UAV anomaly detection module 218 stored on the memory 206 of the traffic controller 106. At step 706 and with reference to FIG. 9, the traffic controller 106 analyzes the UAV collected data for each target zone and determines if for a traffic flow rate therein (which is less than a threshold such as 2 vehicles per minute), vehicles or objects are detected therein or not. If not, the traffic controller 106 determines that no anomaly is detected. If one or more vehicles are detected in a target zone, then the traffic controller 106 determines that an anomaly is detected. In one example, by performing any known or to be developed image processing methods, the traffic controller 106 can process images and data captured by the UAV 115 to determine that a vehicle is broken down, multiple vehicles have collided, a road condition such as for example, a pipe break or a hole have caused the backup in traffic, etc. An example anomaly 912 is shown in FIG. 9, where vehicles 900 are detected in target zone $4_{10}$. Anomaly 912 corresponds to an accident (collided vehicles 900 shown in FIG. 9) in the target zone $4_{10}$.

At step 708, the traffic controller 106 determines if an anomaly is detected at step 706 or not. If the traffic controller 106 determines that an anomaly is detected, the traffic controller 106, at step 710, sends sensor data captured by the UAV 115 to the GUI 124 to a user (a system operator). The sensor data can include, but is not limited to, images or videos of the anomaly. In response to receiving the sensor data, the system operator, via the GUI 124 may provide input for addressing the anomaly, instructions on which traffic rules to apply, etc.

At step 712, the traffic controller 106 determines if an input from the system operator is received via the GUI 124. If at input is received, then at step 714, the traffic controller 106 determines a traffic rule for the detected anomaly based at least on the received input. For example, the received input may include specific instructions for how to adjust traffic light parameters at the intersection 101 (e.g., timing of different phases of the traffic light 117) or other subsequent/preceding intersections related to the intersection 101. In another example, the instructions can specify which rules in the UAV anomaly rules database 120 to select and apply etc.

However, if at an input is not received at step 712, then at step 716, the traffic controller 106 determines a traffic rule for the detected anomaly. The traffic rule may be an existing rule retrieved from the UAV anomaly rules database 120 (e.g., based on comparison of the detected anomaly at step 706 to other anomalies stored in the UAV anomaly rules database 120 or generating a new rule for the detected anomaly at step 706).

Thereafter, at step 718, the traffic controller 106 sends/fetches the traffic rule determined at step 714 or step 716 to the light controller 102 for implementation (or is provided to the light controller 102 upon receiving a request/query from the light controller 102 for the rule). Thereafter, the process proceeds to step 720, which will be described below.

Referring back to step 708, if at step 708, the traffic controller 106 determines that no anomaly exists, then at step 720, the traffic controller 106 determines if all target zones (according to the UAV settings determined (retrieved) at step 700) have been covered by the UAV 115. If all target zones have been covered, then at step 722, the traffic controller 106 instructs the UAV 115 to return to the launch pad. However, if at step 720, the traffic controller determines that more target zones remain to be searched or monitored by the UAV 115, the process reverts back to step 704 and the traffic controller 106 repeats steps 704, 706, 708, 710, 712, 714, 716, 718, 720 and 722.

Having described various examples of detecting anomalies using UAVs and determining traffic rules for optimizing traffic conditions at the intersection 101, in accordance thereto, the disclosure now turns to implementation of rules by the traffic controller 102.

Figure 10:
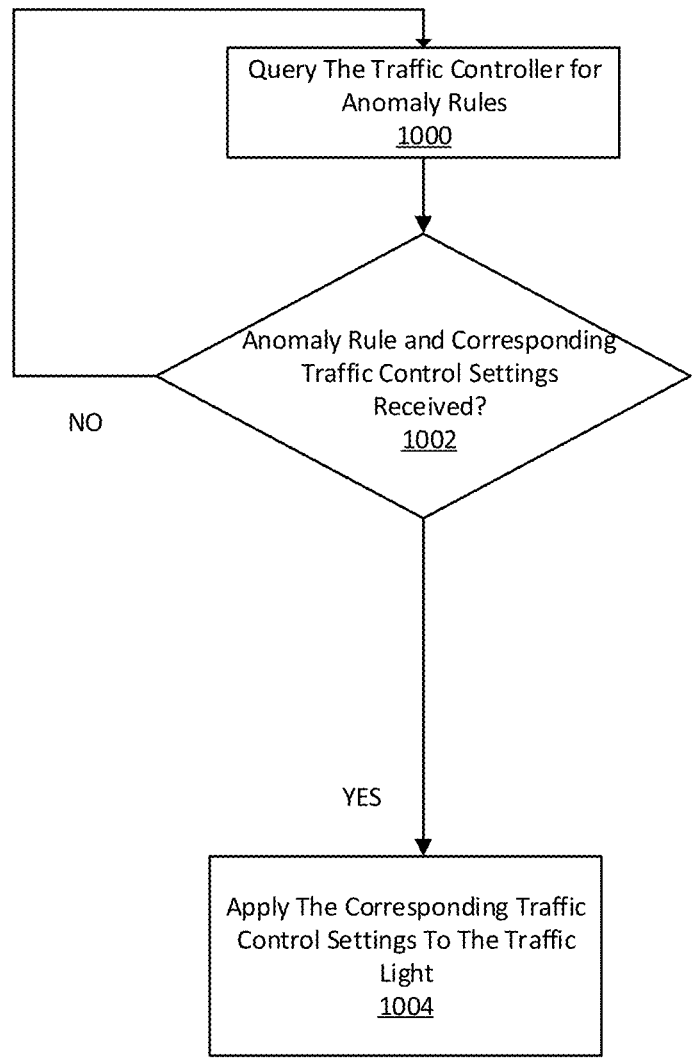
FIG. 10 illustrates a method of controlling traffic by a light controller of FIG. 1.

FIG. 10 illustrates a method of controlling traffic by a light controller of FIG. 1. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed example embodiments.

Furthermore, FIG. 10 will be described from the perspective of the light controller 102. However, it will be understood that the functionalities of the light controller 102 are implemented by the processor 302 executing computer-readable instructions stored on the memory 306 described with reference to FIG. 3.

At step 1000, the light controller 102 may query the traffic controller 106 for anomaly rules and corresponding traffic control settings to apply at the intersection 101. The anomaly rules and corresponding traffic control settings may be determined as described above with reference to FIGS. 1-9.

At step 1002, the light controller 102 determines if an anomaly rule and corresponding traffic control settings are received. If not, the process reverts back to step 1000 and the light controller 102 repeats step 1000 ever predetermined period of time (a configurable parameter that may be determined based on experiments and/or empirical studies) until at least one anomaly rule and corresponding traffic control settings are received.

In one example, the light controller 102 may perform steps 1000 and/or 1002 by executing the computer-readable instructions corresponding to the anomaly control module 310.

Once the light controller determines at step 1002 that at least one anomaly rule and corresponding traffic control settings are received, then at step 1004, the light controller 102 applies the received traffic control settings to the traffic light 117 for controlling traffic through one or more zones of the intersection 101 in order to prevent a likely similar anomaly from occurring.

In one example, the light controller 102 may perform step 1004 by executing the computer-readable instructions corresponding to the anomaly control module 312.

In one example, not only the traffic control settings received by the light controller 102 includes specifications of light phases and durations thereof to be applied to a traffic light 117 of each zone of the intersection 101, it may also include suggestions or directions to be communicated to identified (or approaching) objects at the intersection 101 to further reduce the likelihood of an anomaly from occurring (e.g., an advance warning or suggestion to avoid an upcoming anomaly or accident such as "don't turn right at the intersection 101, etc.).

For example, if a traffic pattern indicates a likelihood of an anomaly, the corresponding anomaly rule may include instructions to be communicated to objects approaching the intersection 101 informing them of the possible anomaly and/or provide suggestions on how to avoid the anomaly (e.g., by suggestion alternative routes to be taken to bypass traveling through the intersection 101).

Accordingly, at the time of (or instead of) applying the traffic control settings to the traffic light 117 at step 1004, the light controller 102 may send signals to vehicles/objects at the intersection 101 and/or those approaching the intersection 101 (e.g., detected within a predetermined distance (e.g., 0.1 mile) of the intersection 101) to notify them of the likely anomaly and/or provide suggestions to avoid traveling through the intersection 101. The notification may be transmitted to radio receivers of the identified vehicles and displayed on a screen thereof or to smart mobile devices of users (pedestrians, drivers, riders) at the intersection 101.

Example embodiments of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, optical disks, compact disc read-only memories (CD-ROMs), and magneto-optical disks, semiconductor memories, such as ROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e. g., computer programming code, such as software or firmware). Moreover, embodiments of the present disclosure may also be downloaded as one or more computer program products, wherein the program may be transferred from a remote computer to a requesting computer by way of data signals embodied in a carrier wave or other propagation medium via a communication link (e.g., a modem or network connection).

What is claimed is:

1. A method of adaptive traffic control, the method comprising:
   receiving traffic data at an intersection;
   determining statistics associated with traffic at the intersection based on the traffic data;
   detecting an anomaly in the traffic based on the statistics;
   utilizing an unmanned aerial vehicle (UAV) to determine a root cause of the anomaly; and
   communicating an anomaly rule based on the root cause to a light controller to control traffic at the intersection.

2. The method of claim 1, wherein determining the statistics comprises:
   recording, for each of a plurality of time intervals and for each zone at the intersection, at least one of:
      an average traffic flow rate for a corresponding zone; and
      whether at least one object is detected in the corresponding zone.

3. The method of claim 2, wherein the UAV is utilized if the average traffic flow rate is less than a threshold and no object is detected in the corresponding zone.

4. The method of claim 2, wherein the anomaly is detected when the average traffic flow rate in a corresponding zone at the intersection is equal to or less than a threshold and no object is detected in the corresponding zone for at least two consecutive ones of the plurality of time intervals.

5. The method of claim 1, wherein utilizing the UAV comprises:
   retrieving settings for the UAV;
   launching the UAV to monitor one or more target zones to determine the root cause; and
   determining if, in one or more of the target zones, a corresponding traffic flow rate is less than a threshold and at least one object is detected therein.

6. The method of claim 5, further comprising:
   processing image data of the one or more target zones for which the corresponding traffic flow rate is less than the threshold;
   sending the image data to a graphical user interface; and
   determining the root cause of the anomaly based on at least one of a result of processing the image data or an input received from the graphical user interface in response to sending of the image data.

7. The method of claim 1, further comprising:
   determining the anomaly rule by:
      retrieving an existing anomaly rule from an anomaly rules database; or
      generating a new anomaly rule, wherein
      the existing anomaly rule or the new anomaly rule has one or more traffic control settings to be applied to a traffic light at the intersection to at least one of prevent future occurrences of the anomaly or reduce a current impact of the anomaly on existing traffic at the intersection.

8. A traffic controller, comprising:
   memory having computer-readable instructions stored therein; and
   one or more processors configured to execute the computer-readable instructions to:
      receive traffic data at an intersection;
      determine statistics associated with traffic at the intersection based on the traffic data;
      detect an anomaly in the traffic based on the statistics;

utilize an unmanned aerial vehicle (UAV) to determine a root cause of the anomaly; and communicate an anomaly rule based on the root cause to a light controller to control traffic at the intersection.

9. The traffic controller of claim 8, wherein the one or more processors are configured to execute the computer-readable instructions to determine the statistics by recording, for each of a plurality of time intervals and for each zone at the intersection, at least one of:

an average traffic flow rate for a corresponding zone; and whether at least one object is detected in the corresponding zone.

10. The traffic controller of claim 9, wherein the UAV is utilized if the average traffic flow rate is less than a threshold and no object is detected in the corresponding zone.

11. The traffic controller of claim 9, wherein the anomaly is detected when the average traffic flow rate in a corresponding zone at the intersection is equal to or less than a threshold and no object is detected in the corresponding zone for at least two consecutive ones of the plurality of time intervals.

12. The traffic controller of claim 8, wherein the one or more processors are configured to execute the computer-readable instructions to utilize the UAV by:

retrieving settings for the UAV;

launching the UAV to monitor one or more target zones to determine the root cause; and determining if, in one or more of the target zones, a corresponding traffic flow rate is less than a threshold and at least one object is detected therein.

13. The traffic controller of claim 12, wherein the one or more processors are configured to execute the computer-readable instructions to:

process image data of the one or more target zones for which the corresponding traffic flow rate is less than the threshold;

send the image data to a graphical user interface; and determine the root cause of the anomaly based on at least one of a result of processing the image data or an input received from the graphical user interface in response to sending of the image data.

14. The traffic controller of claim 8, wherein the one or more processors are configured to execute the computer-readable instructions to determine the anomaly rule by:

retrieving an existing anomaly rule from an anomaly rules database; or generating a new anomaly rule, wherein the existing anomaly rule or the new anomaly rule has one or more traffic control settings to be applied to a traffic light at the intersection to at least one of prevent future occurrences of the anomaly or reduce a current impact of the anomaly on existing traffic at the intersection.

15. The traffic controller of claim 8, wherein the one or more processors are configured to execute the computer-readable instructions to determine the anomaly rule by:

retrieving an existing anomaly rule from an anomaly rules database; or generating a new anomaly rule, wherein the existing anomaly rule or the new anomaly rule has one or more traffic control settings to be applied to a traffic light at the intersection to at least one of prevent future occurrences of the anomaly or reduce a current impact of the anomaly on existing traffic at the intersection.

16. One or more non-transitory computer-readable medium having computer-readable instructions, which when executed by one or more processors, cause the one or more processors to:

receive traffic data at an intersection;

determine statistics associated with traffic at the intersection based on the traffic data;

detect an anomaly in the traffic based on the statistics;

utilize an unmanned aerial vehicle (UAV) to determine a root cause of the anomaly; and communicate an anomaly rule based on the root cause to a light controller to control traffic at the intersection.

17. The one or more non-transitory computer-readable medium of claim 16, wherein the execution of the computer-readable instructions by the one or more processors cause the one or more processors to determine the statistics by recording, for each of a plurality of time intervals and for each zone at the intersection, at least one of:

an average traffic flow rate for a corresponding zone; and whether at least one object is detected in the corresponding zone.

18. The one or more non-transitory computer-readable medium of claim 17, wherein the UAV is utilized if the average traffic flow rate is less than a threshold and no object is detected in the corresponding zone.

19. The one or more non-transitory computer-readable medium of claim 16, wherein the execution of the computer-readable instructions by the one or more processors cause the one or more processors to utilize the UAV by:

retrieving settings for the UAV;

launching the UAV to monitor one or more target zones to determine the root cause; and determining if, in one or more of the target zones, a corresponding traffic flow rate is less than a threshold and at least one object is detected therein.

20. The one or more non-transitory computer-readable medium of claim 19, wherein the execution of the computer-readable instructions by the one or more processors cause the one or more processors to:

process image data of the one or more target zones for which the corresponding traffic flow rate is less than the threshold;

send the image data to a graphical user interface; and determine the root cause of the anomaly based on at least one of a result of processing the image data or an input received from the graphical user interface in response to sending of the image data.

* * * * *